US012789152B2

(12) United States Patent
Cadorin et al.

(10) Patent No.: US 12,789,152 B2
(45) Date of Patent: Nov. 10, 2026

(54) SCRAPING AND/OR MIXING ASSEMBLY FOR MIXING APPARATUS FOR FOOD, PHARMACEUTICAL OR COSMETIC PRODUCTS, AND MIXING APPARATUS COMPRISING SUCH AN ASSEMBLY

(71) Applicant: FIREX S.R.L, Sedico (IT)

(72) Inventors: Paolo Cadorin, Sedico (IT); Aldo Praloran, Sedico (IT)

(73) Assignee: FIREX S.R.L, Sedico (IT)

( * ) Notice: Subject to any disclaimer, the term of this patent is extended or adjusted under 35 U.S.C. 154(b) by 549 days.

(21) Appl. No.: 18/239,972

(22) Filed: Aug. 30, 2023

(65) Prior Publication Data

US 2024/0075437 A1 Mar. 7, 2024

(30) Foreign Application Priority Data

Sep. 1, 2022 (IT) ........................ 102022000017955

(51) Int. Cl.

| | |
|---|---|
| ***B01F 27/052*** | (2022.01) |
| ***B01F 27/091*** | (2022.01) |
| ***B01F 27/112*** | (2022.01) |
| ***B01F 27/90*** | (2022.01) |
| *B01F 101/06* | (2022.01) |
| *B01F 101/21* | (2022.01) |
| *B01F 101/22* | (2022.01) |

(52) U.S. Cl.

CPC .......... *B01F 27/052* (2022.01); *B01F 27/091* (2022.01); *B01F 27/112* (2022.01); *B01F 27/90* (2022.01); *B01F 2101/06* (2022.01); *B01F 2101/21* (2022.01); *B01F 2101/22* (2022.01)

(58) Field of Classification Search

CPC ............................... B01F 27/091; B01F 27/82

See application file for complete search history.

(56) References Cited

FOREIGN PATENT DOCUMENTS

| | | | | |
|---|---|---|---|---|
| DE | 197 42 684 A1 | | 4/1999 | |
| DE | 202004010410 U1 | * | 11/2004 | ........... B01F 27/091 |
| JP | 2018140196 A | * | 9/2018 | |

OTHER PUBLICATIONS

Apr. 18, 2023 Search Report and Written Opinion issued in Italian Patent Application No. 2022000017955.

* cited by examiner

*Primary Examiner* — Elizabeth Insler
(74) *Attorney, Agent, or Firm* — Oliff PLC

(57) ABSTRACT

A scraping and/or mixing assembly for a mixing apparatus for food, pharmaceutical or cosmetic products, including a mixing arm element and at least one respective scraping and/or mixing element attached to each other by a quick-release attachment assembly including a support element and a body element connected to the scraping and/or mixing element. The support element and body element are attachable to each other by a first releasable clamping assembly including a first retaining element movable between a clamping position, clamping the support and body elements to each other, and a releasable position. The first releasable clamping assembly includes a first resilient clamping element made integral with one of the body element and the support element and movable between a rest position, wherein it engages the first retaining element to keep it in the clamped position, and a stressed position, wherein it disengages the first retaining element to release it.

11 Claims, 8 Drawing Sheets

SCRAPING AND/OR MIXING ASSEMBLY FOR MIXING APPARATUS FOR FOOD, PHARMACEUTICAL OR COSMETIC PRODUCTS, AND MIXING APPARATUS COMPRISING SUCH AN ASSEMBLY

TECHNICAL FIELD OF THE INVENTION

The present invention relates to a scraping and/or mixing assembly for a mixing apparatus for food, pharmaceutical or cosmetic products. In addition, the present invention relates to a mixing apparatus comprising said scraping and/or mixing assembly.

STATE OF THE PRIOR ART

Mixing apparatuses for food, pharmaceutical or cosmetic products are known in the state of the art. In a known type of mixing apparatus, mixing of products may take place at room temperature conditions or before and/or during and/or after a heat treatment, such as the cooking of a food product, which is performed by heating devices associated with the mixing apparatus.

Document U.S. Pat. No. 5,615,951 describes an example of a food mixing apparatus. Such a mixing apparatus comprises a processing tank in which a rotating shaft, typically motor-driven, is mounted. One or more mixing arms in turn equipped with one or more scraping and/or mixing elements are attached to the rotating shaft. In particular, the mixing apparatus is configured to provide a desired capacity for mixing the food product by the mixing elements, and/or by providing for continuous scraping of the inner surfaces of the processing tank walls by the scraping elements.

Although such well-known mixing apparatuses work adequately in many cases, they nevertheless have drawbacks.

In fact, particularly in the case of professional or industrial mixing apparatuses, the scraping and/or mixing elements must be replaced at high frequency, depending on the intensity of use of the mixing apparatus and/or the characteristics of a given product and/or the cleaning procedures for a given product. The frequency of replacement is higher in the case of the scraping elements because they are subject to a high degree of wear due to their constant contact with the inner surfaces of the processing tank walls.

In particular, known mixing apparatuses for food, pharmaceutical, or cosmetic products comprise assemblies for attaching the scraping and/or mixing elements which provide for the use of screw and/or bolt elements. In this state, the maintenance/replacement and cleaning steps of the scraping and/or mixing elements are time-consuming and/or difficult because of the need to use one or more suitable tools. In addition, for some types of equipment, depending on the shape of the processing tank and the position of the scraping and/or mixing elements on the arms, it is likely that the use of the tools may be even more difficult.

In addition, especially in the food and pharmaceutical sectors, directives or voluntary standards of good manufacturing practice are being issued with the aim of increasing the safety of the products obtained and the use of the apparatuses, providing for components that may be easily disassembled and that have a reduced number of screw and/or bolt elements, or none at all.

For example, in the United States, NSF/ANSI 4:2020 provides for future revisions that will establish additional minimum safety and sanitation requirements for the materials, design, construction, and performance of commercial cooking, reheating and food preservation apparatuses and components.

In particular, the standard requires that no attachment assemblies comprising screw and/or bolt elements be used in regions in contact with the food product or, if they are provided, they must not have exposed threads and/or protruding screws.

It is reasonable to assume that similar regulations may be issued in other countries in the future, requiring that food, pharmaceutical, or cosmetic mixing devices be made up of components that may be easily disassembled and have a reduced number of screw and/or bolt elements, or none at all, to meet the requirements of similar regulations or good manufacturing practice standards.

Patent document JP6702659 describes a scraping and/or mixing assembly comprising a mixing arm and a scraping element removably attachable to each other by means of an attachment assembly. The attachment assembly comprises a support element rotatably hinged on the mixing arm and a retaining element adapted to clamp the scraping element thereto. In particular, the attachment assembly also comprises a removable helical spring which, under operating conditions, presses on the mixing arm and on the retaining element to keep the latter in a clamping position and, at the same time, to keep the scraping element in permanent contact with the internal surfaces of the walls of the processing tank, while stressing the rotation of the retaining element with respect to the mixing arm.

However, the construction provided for in JP67702659 is inconvenient to use by an operator because the steps of deforming and inserting/removing the helical spring to/from the position between the mixing arm and the retaining element are laborious and require a high degree of skill and experience. In particular, due to the shape of the helical spring and the hard-to-access location where it is installed, it is likely to fall in an undesirable manner during handling.

Furthermore, this construction is specifically designed to allow permanent contact between the inner surfaces of the processing tank walls and the scraping element, which is rotatable with respect to the arm. Therefore, such a construction is not versatile and cannot easily be used in the design of other constructions, for example, with scraping and/or mixing elements that are operationally unmovable, i.e. non-rotatable with respect to the mixing arm, or are located in different parts thereof.

Therefore, it is necessary to find a solution that overcomes at least one of the drawbacks described above.

SUMMARY OF THE INVENTION

The task of the present invention is to provide a scraping and/or mixing assembly for a mixing apparatus for food, pharmaceutical or cosmetic products which provides an effective construction suitable for reducing or eliminating screw and/or bolt elements.

In the context of the task set forth above, an object of the present invention relates to a scraping and/or mixing assembly which provides for easy operation, preferably without the use of assembly/disassembly tools.

Another object relates to a scraping and/or mixing assembly which provides for a secure attachment of a scraping and/or mixing element to a mixing arm element.

Another object relates to a scraping and/or mixing assembly which provides for an easy-to-clean and maintain construction.

Another object concerns a scraping and/or mixing assembly that provides an easily achievable construction.

Another object concerns a scraping and/or mixing assembly having a construction which may be widely varied at the design stage, for example according to function (scraping and/or mixing) and type of food product.

Another object concerns a mixing apparatus for food, pharmaceutical, or cosmetic products which provides for the reduction or elimination of screw and/or bolt elements.

The foregoing task and objects, and others which will become more apparent in the following description, are accomplished by means of a scraping and/or mixing assembly as defined in the independent claim, and a mixing apparatus comprising the same. Preferred embodiments are defined in dependent claims.

BRIEF DESCRIPTION OF THE FIGURES

The additional features and advantages of the scraping and/or mixing assembly for a mixing apparatus for food, pharmaceutical or cosmetic products according to the present invention will become more apparent in the following description relating to embodiments given by way of non-limiting example only, with reference to the following figures, wherein.

DETAILED DESCRIPTION OF THE INVENTION

The present invention relates to a scraping and/or mixing assembly for a mixing apparatus for food, pharmaceutical or cosmetic products. Preferably, said mixing apparatus is suitable for mixing products under room temperature conditions or before and/or during and/or after heat treatment, under pressure, under vacuum, under controlled atmosphere and the like, such as cooking in the case of certain types of food products. Such a treatment may be carried out by means of suitable devices associated with the mixing apparatus, such as heating, pressure generating, controlled atmosphere generating or vacuum generating devices and the like.

In the following description, reference will be made to a mixing apparatus for processing a food product by mixing and heat treatment, such as a mixing and cooking apparatus, which is suitable for cooking, boiling, braising, frying, pasteurizing, browning, sautéing, blanching, roasting, or the like, depending on the application. However, this reference should be understood only as a non-limiting example, since the mixing apparatus according to the present invention may be used for processing by mixing any food, pharmaceutical or cosmetic product by optionally providing for any type of heat and/or pressure and/or vacuum and/or controlled atmosphere and/or similar treatment. Moreover, in the following description, terms such as "high," "low," "top," "bottom" or the like refer to a mixing apparatus and a scraping and/or mixing assembly, according to the present invention, in the typical working set-up as depicted in the accompanying figures.

In addition, in the following description, the term "connected" may comprise either a direct connection, wherein two components come into contact and are attached to each other by connecting means or are integral with each other, or an indirect connection, in which at least one additional element is located between the two components.

Furthermore, in the following description, the term "scraping and/or mixing" refers to any assembly or element that is adapted for scraping and/or mixing and/or agitating and/or whipping and/or beating the food, pharmaceutical or cosmetic product.

Figure 1:
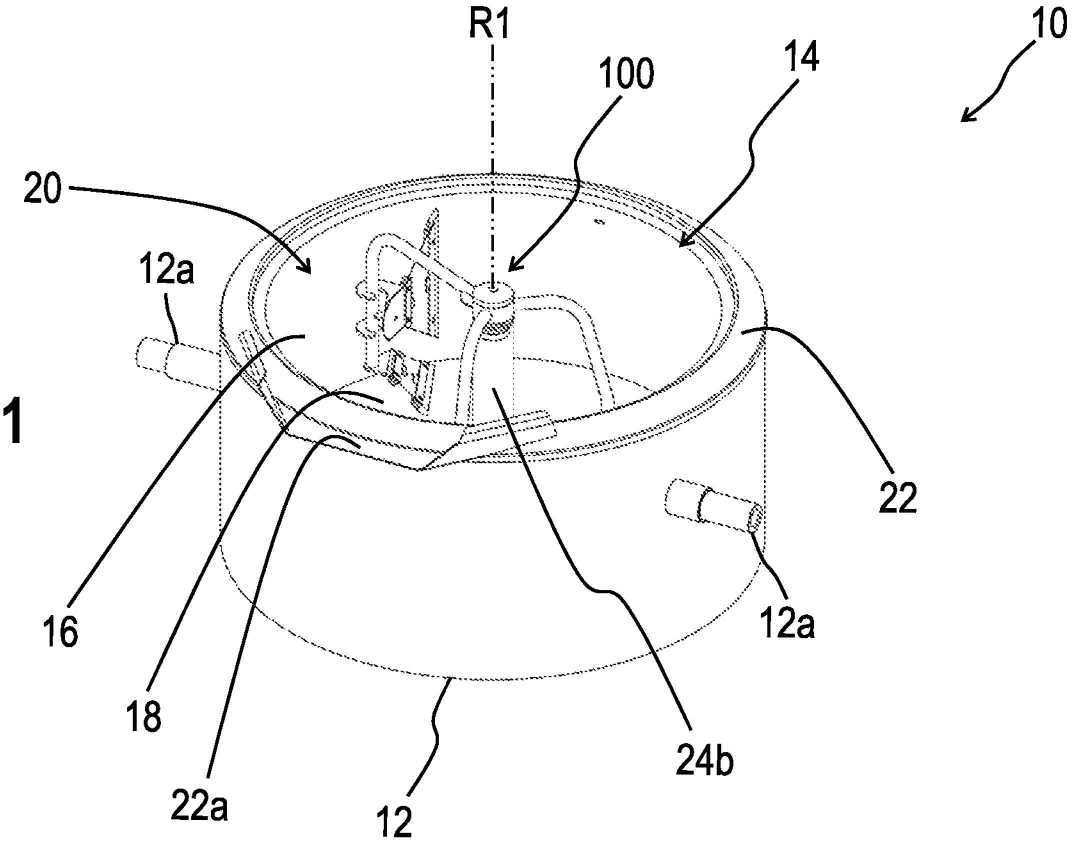
FIG. 1 is a perspective view of a mixing apparatus comprising a scraping and/or mixing assembly, according to a preferred embodiment of the present invention.
Figure 2:
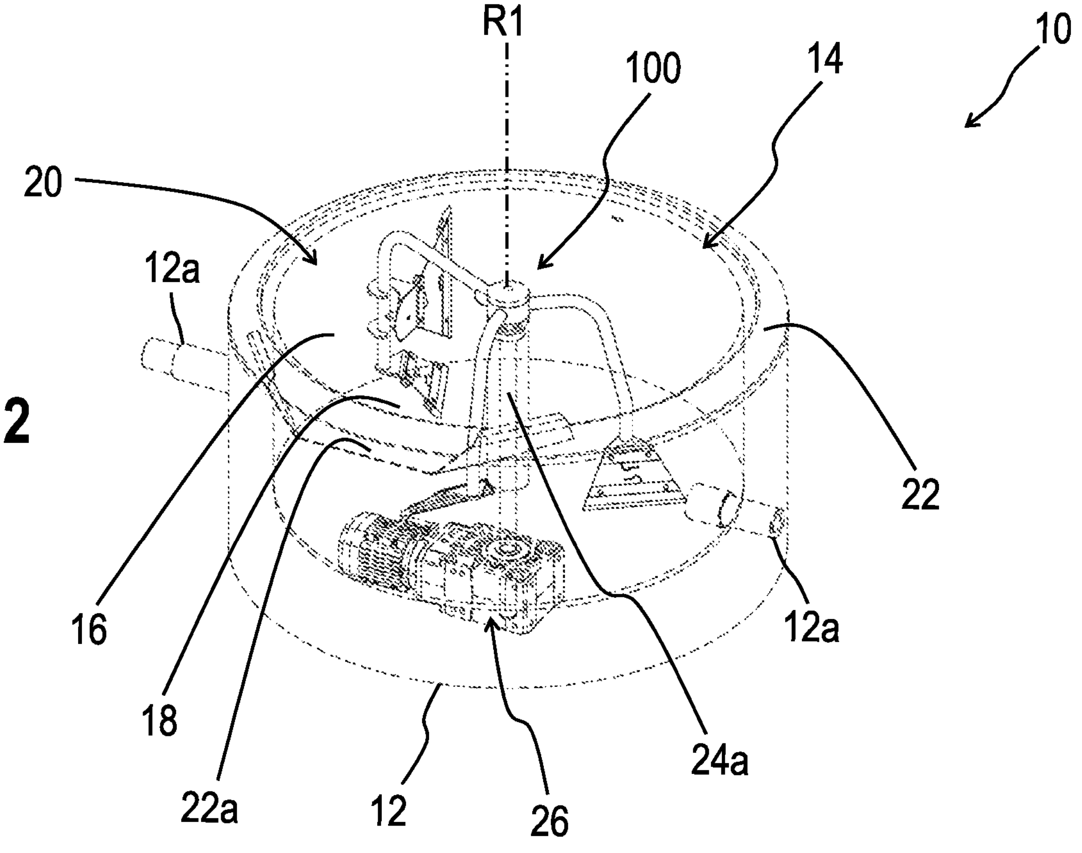
FIG. 2 is the perspective view of the mixing apparatus in FIG. 1, in which some components are shown in transparency by hatching.

FIGS. 1 and 2 show a mixing apparatus 10 for food, pharmaceutical or cosmetic products, comprising a scraping and/or mixing assembly 100, according to a preferred embodiment of the present invention.

In the present preferred embodiment, the mixing apparatus 10 is configured to mix and cook food products, such as an industrial cooker. However, as noted above, this selection is not limiting, and the mixing apparatus 10 may, for example, be configured to mix food products at room temperature or at low temperature.

The mixing apparatus 10 preferably comprises a housing 12 possibly provided with a floor support structure (not shown in the figures).

A processing tank 14 is disposed within the housing 12, preferably substantially cylindrical in shape having a side wall 16 connecting a bottom wall 18 and an opposing open upper base 20, the latter arranged substantially at an upper panel 22 of the housing 12.

The processing tank 14 is adapted for receiving the food product, such as a food or a mixture of several food ingredients having any solid, liquid, pasty or similar form, or combinations thereof. The housing 12 may be provided with a lid (not shown in the figures) adapted for reversibly closing the open upper base 20 of the processing tank 14.

The housing 12 further comprises a pair of pivot pins 12*a*, configured to rotate the processing tank 14 relative to the ground support structure, and a spout portion 22*a* disposed on the top panel 22 to channel the food product when it is poured from the processing tank 14 by rotation of the housing 12 about the pivot pins 12*a*.

In the present embodiment, the mixing apparatus 10 further comprises, within the housing 12, a heating unit (not shown in the figures), preferably operated by electricity, gas, direct or indirect steam, or the like, which is configured to heat the processing tank 14 and its contents by known systems, such as a combination of one or more resistive elements associated with the side 16 and/or bottom 18 walls, which are in turn driven by a power supply, preferably electronically controlled.

A rotating shaft 24*a* is disposed within the processing tank 14, preferably projecting upwardly from the bottom wall 18 through a tubular support element 24*b* at a position substantially coaxial with the processing tank 14. The rotating shaft 24*a* is rotatable about its own axis of rotation R1, preferably coaxial with the axis of the processing tank 14, by means of a rotary drive assembly 26 (best seen in FIG. 2, where the housing 12 is shown in transparent form by hatching). The rotary drive assembly 26, for example comprising an electric motor or the like, is preferably located below the processing tank 14 near the bottom wall 18.

The scraping and/or mixing assembly 100 is housed in the processing tank 14 and is connected to the rotary drive assembly 26 via the rotating shaft 24*a*, preferably detachably by suitable coupling means or elements, to rotate integrally therewith about the axis of rotation R1. In a more preferred embodiment, the scraping and/or mixing assembly 100 is connected to the rotating shaft 24*a* by removable coupling means or elements that may be manually operated without the use of tools.

In the present embodiment, the scraping and/or mixing assembly 100 is configured to mix the food product by rotating within the processing tank 14 while continuously scraping off a portion of the food product that remains adhered to the inner surface of the bottom 18 and/or side 16 walls of the processing tank 14.

Referring in particular to FIGS. 3 to 9, the scraping and/or mixing assembly 100 preferably comprises a hub element 102 (visible in FIG. 3) from which extends one or more (at least one) mixing arm elements 104 (three in FIG. 3), each of which is mutually removably attachable to a respective scraping and/or mixing element 106, such as a scraping and/or mixing spatula 106, by means of a corresponding quick-release attachment assembly 108.

In the present embodiment, the scraping and/or mixing element 106 is adapted, under operating conditions, to be in sliding contact on the inner surface of the bottom 18 and/or side 16 walls of the processing tank 14, while simultaneously scraping and mixing the food product. For this purpose, the scraping and/or mixing element 106 may, for example, have a substantially spatula shape, as in the present embodiment, or it may have additional shapes or structures depending on the function (scraping and/or mixing) and the type of food product.

The hub element 102, having a substantially cylindrical shape, is configured to be preferably removably attachable to the rotating shaft 24*a* of the mixing apparatus 10.

For this purpose, the hub element 102 may, for example, comprise a coupling seat 110 adapted to be engaged by a coupling portion (not shown in the figures) of the rotating shaft 24*a* and to be attached thereto by a clamping element 112. In particular, the coupling seat 110, such as a through hole, extends along the direction of the axis of rotation R1 and provides a cross-section having a non-circular shape when viewed along the direction of the axis of rotation R1. For example, the coupling seat 110 is a rectangular through hole, and is also configured to be engaged by the coupling portion having a complementary shape, such as a rectangular projection, protruding from the upper end of the rotating shaft 24*a* along the direction of the axis of rotation R1. The clamping element 112, such as, for example, a threaded ferrule element, is configured to achieve clamping, preferably manually without the use of tools, of the hub element 102 on the rotating shaft 24*a*, i.e. on its coupling portion which is possibly provided with a thread adapted for cooperating with the thread of the clamping element 112. However, it is apparent that the hub element 102 may provide for additional constructions and/or means for attaching to the rotating shaft 24*a*. For example, in further embodiments, the hub element 102 may be welded or formed in one piece with the rotating shaft 24*a*.

Said one or more mixing arm elements 104, preferably formed of steel, extend substantially cantilevered from the hub element 102 in angularly offset positions about the axis of rotation R1, to possibly substantially reach the proximity of the inner surface of the bottom 18 and/or side 16 walls, of the processing tank 14. Preferably, each mixing arm element 104 is configured to operatively reach a respective proximity zone of the bottom wall 18 that is different from that of the other mixing arms 104. In the present embodiment, the mixing arm elements 104 provide a substantially inverted “L” shape having a first portion 104*a* extending integrally from the hub element 102 along a direction substantially orthogonal to the axis of rotation R1, a second portion 104*b* consecutive to the first portion 104*a* and folded about 90 degrees therefrom, and an end portion 104*c* distal from the hub element 102. However, it is apparent that the construction, shape and size of the mixing arm elements 104, and portions thereof, may vary widely depending on the application. Potentially, the mixing arm elements 104 may be configured to be removably attachable to the hub element 102 by means of suitable coupling assemblies. Alternatively, the mixing arm elements 104 may be made integral with the hub element 102, for example by welding. According to a further alternative, the portions of each mixing arm element 104 may be formed separately and then made integral with each other, for example by welding.

Each of the scraping and/or mixing elements 106 is removably attachable to a portion of the respective mixing arm element 104 by the corresponding quick-release attachment assembly 108.

Figure 3:
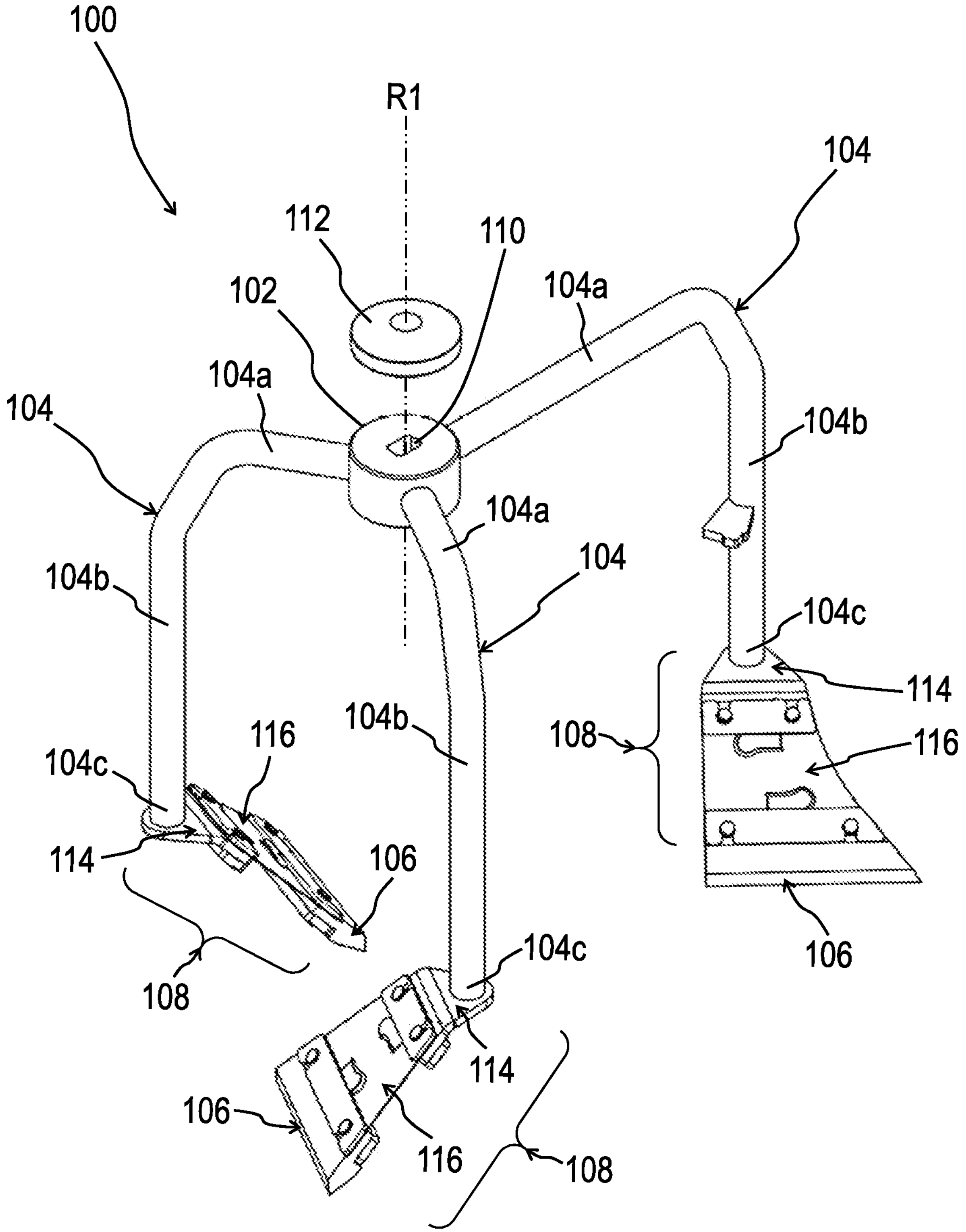
FIG. 3 is a perspective view of the scraping and/or mixing assembly in FIG. 1.
Figure 4:
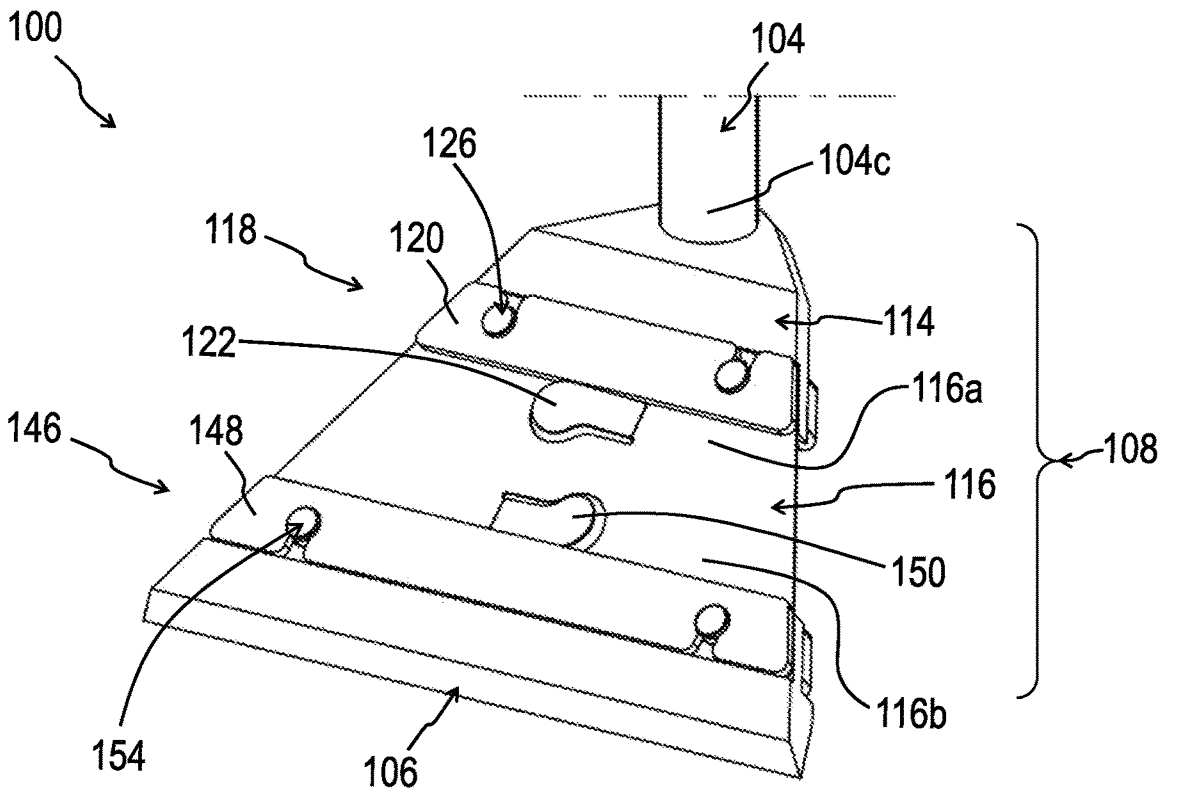
FIG. 4 is a perspective view of the scraping and/or mixing assembly in FIG. 3, enlarged at a scraping and/or mixing element.

For example, in the present embodiment some scraping and/or mixing elements 106 are removably attachable to the end portions 104*c* of each mixing arm element 104. On the other hand, other scraping and/or mixing elements 106, may be removably attachable to other portions of each mixing arm element 104, such as the second portion 104*b* as further described below (for simplicity, only the scraping and/or mixing elements 106 attached to the end portions 104*c* are shown in FIG. 3).

In particular, the quick-release attachment assembly 108, which connects each scraping and/or mixing element 106 to a portion, such as the end portion 104*c*, of a respective mixing arm element 104, includes a support element 114 and a body element 116 which are separate and, moreover, may be mutually coupled by an at least partial overlapping relationship.

The support element 114, for example, having a folded plate shape, preferably made of steel, is connected to the end portion 104*c* of the mixing arm element 104. In the present embodiment, the support element 114 is connected to the end portion 104*c* of the mixing arm element 104 by welding or is formed in one piece. Alternatively, however, the support element 114 may be releasably connected to a portion of the mixing arm element 104 with a suitable connection assembly, possibly of the quick-release or snap type, as described below.

The body element 116, for example, having a planar plate shape, preferably made of steel or harmonic steel, is connected to the scraping and/or mixing element 106. In the present embodiment, the body element 116 is formed separately from the scraping and/or mixing element 106 and is attachable thereto by a suitable releasable clamping assembly, as further described below. However, further embodiments may be provided in which the body element 116 is connected to the scraping and/or mixing element 106 by welding or is formed in one piece. The embodiment in which the body element 116 is formed of harmonic steel advantageously ensures a reliable resilient bias for a scraping element 106 in contact with the side 16 and/or bottom 18 walls of the processing tank 14.

Referring to FIGS. 4 to 8, the support element 114 and the body element 116 are attachable to each other by means of a first releasable clamping assembly 118 comprising a first retaining element 120 adapted to move between a clamping position, in which it cooperates with said support element 114 and said body element 116 to mutually clamp them, and a releasing position, in which the latter are mutually released. The first retaining element 120, for example having a planar plate shape preferably made of steel or a plastic material such as Teflon, is provided separately from said support element 114 and said body element 116.

Figure 5:
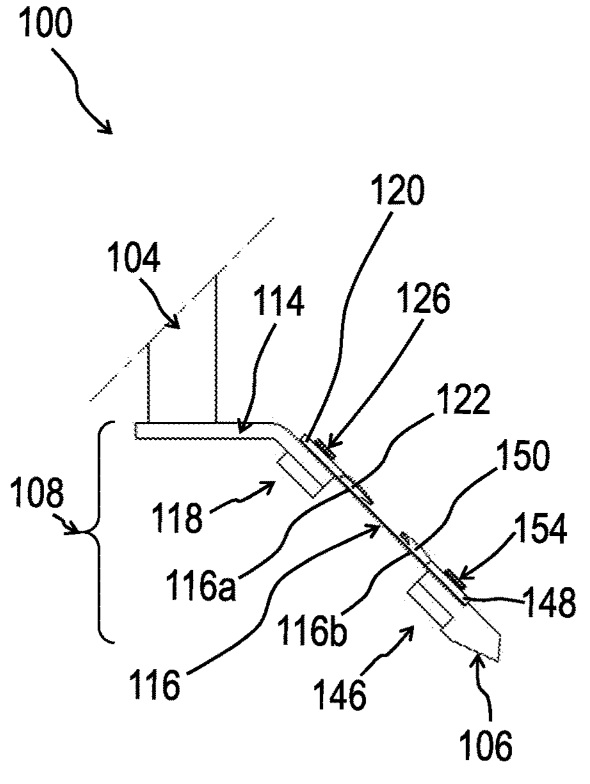
FIG. 5 is a side view of the scraping and/or mixing assembly in FIG. 4, wherein resilient clamping elements are in a resting position.
Figure 6:
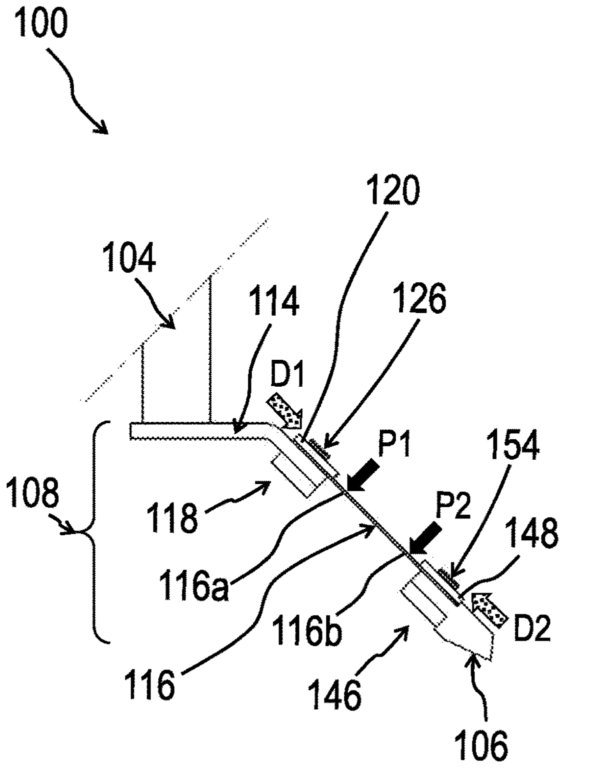
FIG. 6 is the side view of the scraping and/or mixing assembly in FIG. 5, wherein the resilient clamping elements are in a stressed position.

According to the present invention, the first releasable clamping assembly 118 further comprises a first resilient clamping element 122 that is made integral with one of said body element 116 and said support element 114. Referring in particular to FIGS. 5 and 6, the first resilient clamping element 122 is movable, preferably by manual actuation, between a rest position (see FIG. 5), in which it is adapted to engage, by contact relationship, said first retaining element 120 to maintain the latter in said clamping position, and a stressed position (see FIG. 6), in which it is adapted to disengage from said first retaining element 120 to allow the latter to be released from said clamping position.

In the present invention, the term "resilient element" means an element, formed of a suitable material, which upon application of stress or pressure is resiliently deformable, that is, reversibly deformable, in that, the element substantially returns to its original shape when the stress or pressure is removed.

Advantageously, in this state, the scraping and/or mixing assembly 100 provides an effective construction adapted for reducing or eliminating screw and/or bolt elements, thereby substantially eliminating the need for tools to assemble/disassemble the quick-release attachment assembly 108.

In particular, with this construction, the scraping and/or mixing assembly 100 provides ease of operation, for example, it being possible to support the body element 116 and operate the first resilient clamping element 122 with the same hand, while at the same time ensuring a secure attachment of the scraping and/or mixing element 106 to the mixing arm element 104.

Preferably, the first resilient clamping element 122 is made integral with the body element 116 because, in this state, the first releasable clamping assembly 118 is advantageously easier and more intuitive to operate than if the first resilient clamping element 122 were made integral with the support element 114. In addition, in this state, the first releasable clamping assembly 118 is advantageously easier to clean, because the body element 116 is easy to remove and manipulate.

In the present embodiment, the first resilient clamping element 122 comprises or is defined by a first resilient tab connected to the body element 116. In the rest position, i.e. the position wherein it is not stressed, the first resilient clamping tab 122, as the first resilient clamping element 122, is adapted to protrude from the substantially planar surface of the body element 116 to engage, in a contact relationship, the first retaining element 120 (see FIG. 5), preventing the latter from moving out of said clamping position. On the other hand, in the stressed position (see FIG. 6), obtained, for example, by manually applying a first pressure P1, the first resilient clamping tab 122 is adapted for positioning itself substantially flush with the planar surface of the body element 116 to disengage from the first retaining element 120, allowing the latter to be displaced from said clamping position.

Preferably, the first retaining element 120 is configured to glide substantially in sliding contact, when moved between said clamping position and said release position, on a substantially planar first surface portion **116*a* of the respective body element 116 with which the first resilient clamping element 122 is made integral. On the other hand, the first resilient clamping element 122 is formed substantially at said first surface portion 116*a* and is further configured to protrude from and be flush with the first surface portion 116*a*** in the rest position and the stressed position, respectively.

Advantageously, this construction also provides for further ease of operation and secure attachment of the scraping element 106 to the mixing arm element 104. In fact, with such a construction it is possible to support the body element 116 and operate the first resilient clamping element 122 with the same hand. Once the first resilient clamping element 122 is actuated, the stressed position thereof is maintained substantially automatically by the sliding of the first retaining element 120 on the first surface portion **116*a*, engaging the first resilient clamping element 122 in an overlapping relationship during both disassembly and assembly. Thus, in this state, the first releasable clamping assembly 118** is particularly easy to manipulate and operate.

In the preferred embodiment, the first resilient clamping tab 122, as the first resilient clamping element 122, is formed in one piece with the body element 116 with which it is made integral. For example, the first resilient clamping tab 122 may be formed, i.e., defined, by through-notching and subsequent plastic deformation of a portion of the body element 116 such that in the rest position, i.e., the position in which it is unstressed, it protrudes from the substantially planar surface of the body element 116; while in the stressed position, e.g. obtained by manual pressure, it is brought substantially flush with the planar surface of the body element 116.

Advantageously, in this state the scraping and/or mixing assembly 100 provides for a particularly simple construction to design and manufacture.

In the most preferred embodiment, the first resilient clamping tab 122, as the first resilient clamping element 122, is formed of harmonic steel, and even more preferably is formed in one piece with the body element 116 of harmonic steel. As mentioned above, the embodiment in which for the body element 116 is formed of harmonic steel advantageously ensures a reliable resilient bias for a scraping element 106 in contact with the side 16 and/or bottom 18 walls of the processing tank 14.

Further, advantageously, in this state, the first resilient clamping element 122 provides for high strength and reliable operation even under a large number of stresses applied by a user to switch between said rest position and said stressed position to enable the clamping and releasing, respectively, of the first retaining element 120.

Figure 7:
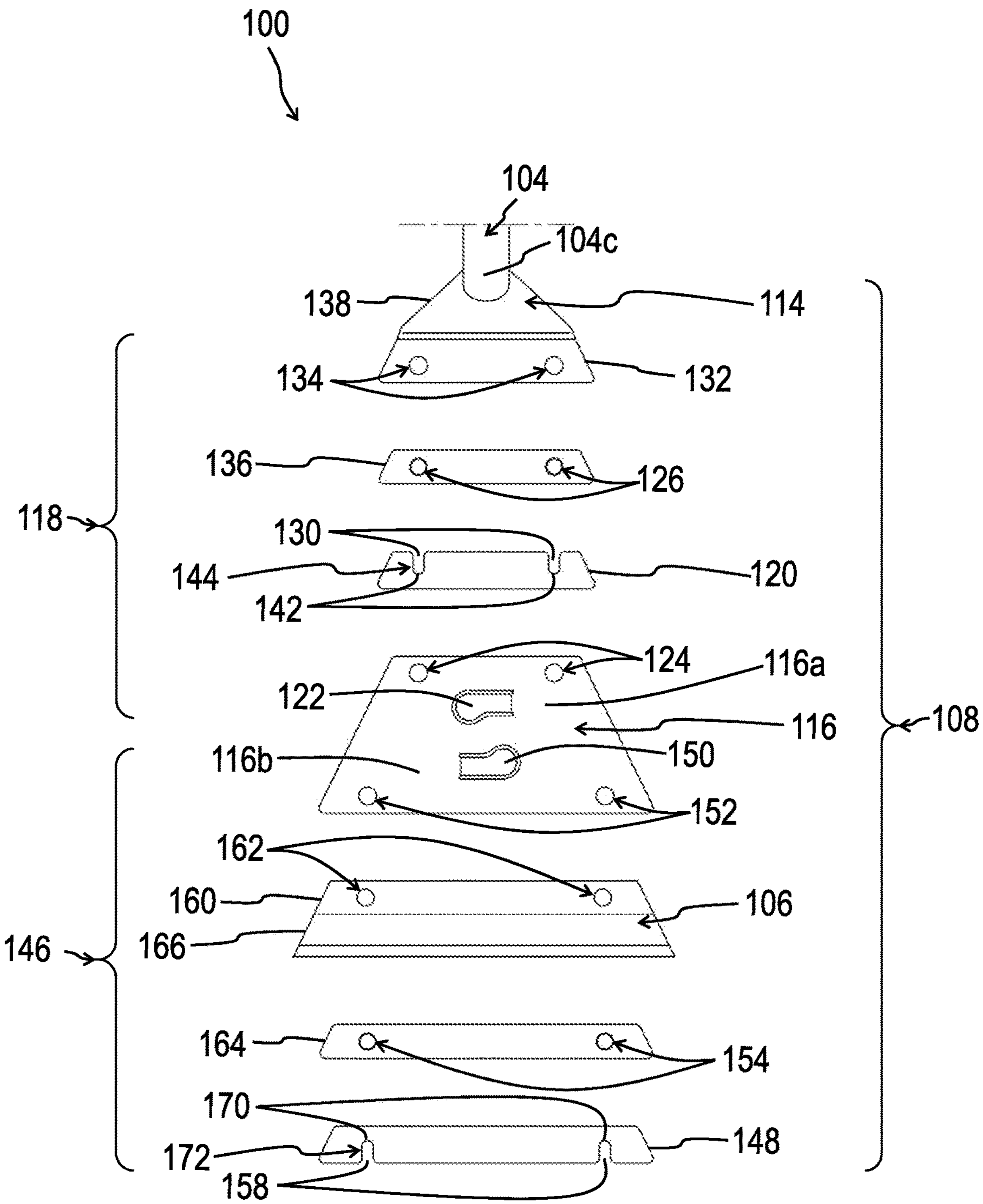
FIG. 7 is a front view of components of the scraping and/or mixing assembly in FIG. 4 separated from each other.
Figure 8:
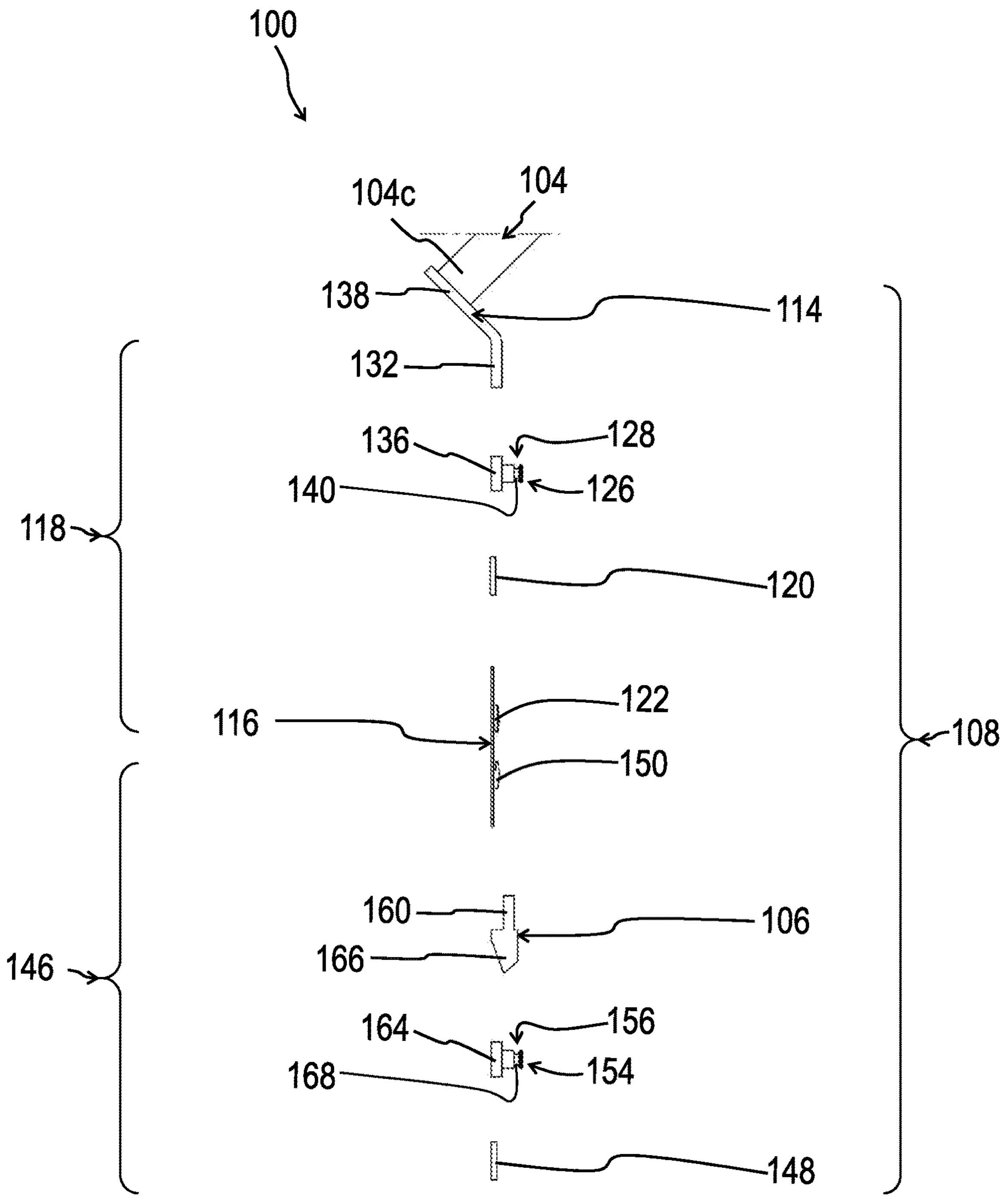
FIG. 8 is a side view of the components of the scraping and/or mixing assembly in FIG. 7 separated from each other.
Figure 9:
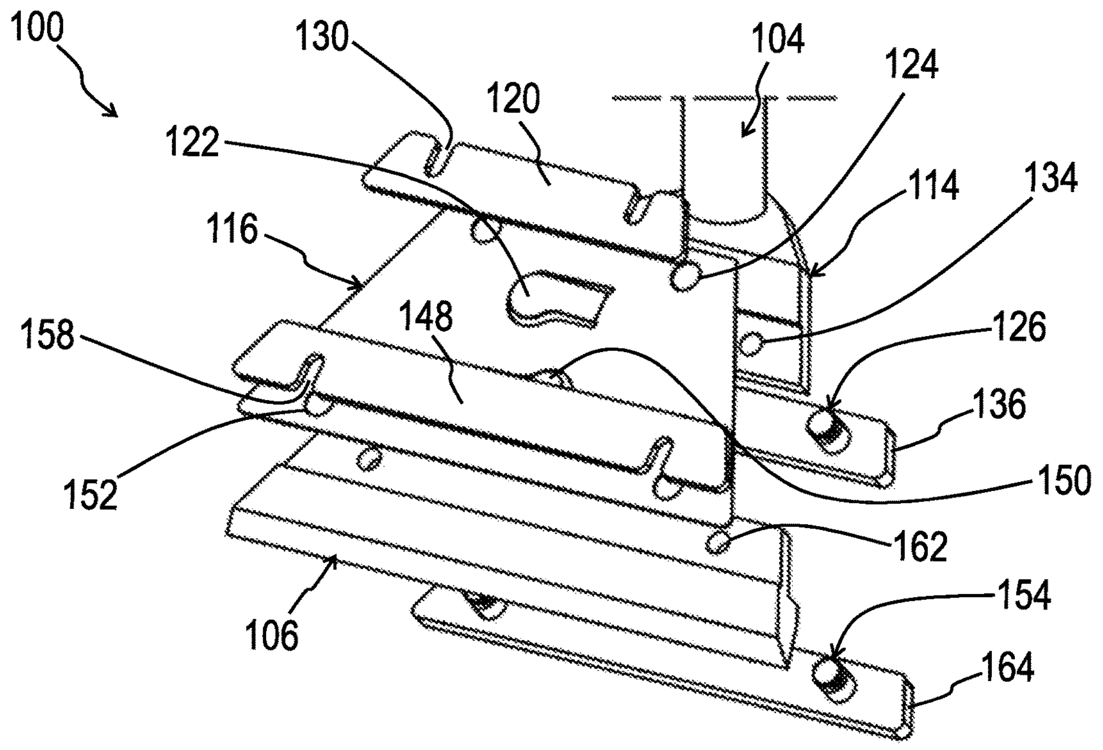
FIG. 9 is an exploded view of the scraping and/or mixing assembly in FIG. 4.

Referring in particular to FIGS. 7 and 8, said first releasable clamping assembly 118 comprises said first retaining element 120 and preferably at least one first engagement through hole 124 engageable by a respective at least one first protruding assembly element 126.

Said at least one first engagement through hole 124 (two in the accompanying figures) is formed substantially on one of said support element 114 and said body element 116 at the overlap region therebetween.

In the present preferred embodiment, the first engagement through holes 124 are formed on the body element 116 substantially at the overlap region thereof with the support element 114.

On the other hand, said at least one first protruding assembly element 126 (two in the accompanying figures) preferably provides for a substantially cylindrical shape and extends from the surface of the other of said supporting element 114 and said body element 116 at the overlap region therebetween.

In the present preferred embodiment, the first protruding assembly elements 126 extend from the support element 114 substantially at the overlap region thereof with the body element 116.

Each of the first protruding assembly elements 126 is configured to engage a respective first engagement through hole 124 when the support element 114 and the body element 116 are coupled together such that a respective first clamping seat 128 (best seen in FIG. 8) of the first protruding assembly elements 126 protrudes from the stack defined by the overlap of said support element 114 and said body element 116.

Furthermore, said first retaining element 120 comprises at least one first clamping section 130 (best seen in FIG. 7) adapted to cooperate with the first clamping seat 128 of a respective first protruding assembly element 126. In particular, the first retaining element 120 is configured to move between said clamping position, in which each first clamping section 130 cooperates with the first clamping seat 128 of a respective first protruding assembly element 126 to mutually clamp the body element 116 on the support element 114, and said release position, in which the latter are mutually released.

Advantageously, in this state, the scraping and/or mixing assembly 100 provides for further ease of use by being able to mount the body element 116 on the support element 114 by intuitively and reliably aligning the first engagement through holes 124 with the protruding assembly elements 126, while ensuring a construction that is easy to design and manufacture.

Preferably, said support element 114 comprises a first support body 132 provided with at least one second engagement through hole 134 (two in the accompanying figures), and a first retaining base 136 provided with said at least one first protruding assembly element 126.

The first support body 132, for example having a planar plate shape preferably made of steel, preferably extends obliquely from an edge of a first intermediate body 138 which in turn is connected to the portion of the respective mixing arm element 104, such as the end portion 104*c*. Said at least one second engagement through hole 134 passes through the thickness of the plate substantially defining the first support body 132.

The first retaining base 136, for example having a planar plate shape, preferably made of steel or a plastic material such as Teflon, is provided separately from the first support body 132. In particular, said at least one first protruding assembly element 126 (two in the accompanying figures) is preferably formed of the same material as the first retaining base 136 and extends from a surface thereof. Also, as mentioned above, said at least one first protruding assembly element 126 preferably provides for a substantially cylindrical shape and comprises said first clamping seat 128 at its distal end relative to the first retaining base 136.

In particular, the first support body 132 and the first retaining base 136 may be coupled together by engaging the second engagement through holes 134 with the respective first protruding assembly elements 126 such that the latter protrude from said first support body 132.

Advantageously, such a construction allows for easy cleaning of the scraping and/or mixing assembly 100 and its components. In fact, the components of the quick-release attachment assembly 108 are easily removable and cleanable, like the first protruding assembly elements 126, which may be relatively more complex to clean than other components. The only component that is substantially non-removable is the support element 114, which preferably remains attached to the mixing arm element 104. However, such a support element 114 comprises a first support body 132 provided with second engagement through holes 134 that are easily cleaned, even in the event that it is not necessary to remove the hub element 102, from which the mixing arm elements 104 extend, from the rotating shaft 24*a*.

In addition, such a construction makes it possible to support the body element 116 and the first retaining base 136 with the same hand while simultaneously operating the first resilient clamping element 122, thereby ensuring easy handling and intuitive operation.

Furthermore, in this state the scraping and/or mixing assembly 100 advantageously provides for a construction that is even easier to design and manufacture because it comprises components having a simple shape, such as the first support body 132 provided with the second engagement through holes 134 and the first retaining base 136 provided with the first protruding assembly elements 126. In particular, the simple shape of these components allows for the creation of replacement kits that further speed up cleaning steps of the scraping and/or mixing assembly 100.

In the present most preferred embodiment, each of the first protruding assembly elements 126 has a substantially cylindrical or parallelepipedal shape, in which the first clamping seat 128 provides a first small-diameter portion 140 having an outer diameter that is smaller than other portions. Said first small-diameter portion 140 is formed in a portion having a predetermined height separated by the distal end of the respective first protruding assembly element 126 relative to the first retaining base 136.

In addition, each first clamping section 130 of the first retaining element 120 preferably comprises at least one first engagement opening 142, such as a notch formed on the edge, which in turn is provided with a first clamping region 144. In particular, each first clamping region 144 has an inner diameter substantially corresponding to the outer diameter of the first small-diameter portion 140 of the corresponding first protruding assembly element 126.

Therefore, at said clamping position of the first retaining element 120 located on the stack defined by the overlap of the support element 114 and the body element 116, the small-diameter portion 140 of each first protruding assembly element 126 is engaged by a respective first clamping region 144 of the first retaining element 120. In this state, the first retaining element 120 mutually presses the support element 114 onto the body element 116, thereby attaching them together.

On the other hand, from said locking position, it is possible to move the first retaining element 120 to said release position by sliding it out, that is, by sliding it on the stack defined by the overlap of the support element 114 and the body element 116, to disengage each small-diameter portion 140 from the respective first clamping region 144. In this state, the first retaining element 120 releases the mutual attachment of the support element 114 to the body element 116.

Advantageously, such a construction simultaneously provides ease of operation and a more secure attachment of the scraping element 106 to the mixing arm element 104. In fact, by appropriately dimensioning the components of the first releasable clamping assembly 118, such as the first protruding elements 126 and the height of the respective first small-diameter portions 140 of the first clamping seats 128, it is possible to ensure a secure attachment of the support element 114 to the body element 116.

In addition, this construction allows for easier cleaning of the scraping and/or mixing assembly 100 and its components. In fact, the components of the quick-release attachment assembly 108 are easily removable and cleanable, as they have simple shapes.

As mentioned above, in the present embodiment, the body element 116 is formed separately from the scraping and/or mixing element 106 and is attachable to the latter by a second releasable clamping assembly 146 that is analogous to the first releasable clamping assembly 118 and its variants, as defined above. Thus, the second releasable clamping assembly 146 provides substantially the same benefits as the first releasable clamping assembly 118 and its variants, as defined above.

In particular, the quick-release attachment assembly 108 connecting each scraping and/or mixing element 106 to a portion of a respective mixing arm element 104, such as the end portion 104*c*, comprises the body element 116 and the scraping and/or mixing element 106, the latter preferably made of a plastic material such as Teflon, which are provided separate and adapted to be mutually coupled in an overlapping relationship, at least partially.

Referring again to FIGS. 4 to 8, the body element 116 and the scraping and/or mixing element 106 are attachable to each other by means of the second releasable clamping assembly 146 comprising a second retaining element 148 adapted to move between a clamping position, in which it cooperates with said scraping and/or mixing element 106 and said body element 116 to mutually clamp them, and a releasing position, in which the latter are mutually released. The second retaining element 148, for example, having a planar plate shape preferably made of steel or a plastic material such as Teflon, is provided separate from said scraping and/or mixing element 106 and said body element 116.

In particular, the second releasable clamping assembly 146 further comprises a second resilient clamping element 150, which is made integral with one of said body element 116 and said scraping and/or mixing element 106. Referring in particular to FIGS. 5 and 6, the second resilient clamping element 150 is movable, preferably manual actuation, between a rest position (see FIG. 5), in which it is adapted to engage, in a contact relationship, said second retaining element 148 to maintain the latter in said clamping position, and a stressed position (see FIG. 6), in which it is adapted to disengage said second retaining element 148 to allow the latter to be released from said clamping position.

Preferably, the second resilient clamping element 150 is made integral with the body element 116 because, in this state, the second releasable clamping assembly 146 is advantageously easier and more intuitive to operate than if the first resilient clamping element 150 were made integral with the scraping and/or mixing element 106. Moreover, in this state, the second releasable clamping assembly 146 is advantageously easier to clean, because the body element 116 may be easily manipulated.

In the present embodiment, the second resilient clamping element 150 comprises, i.e. is defined by, a second resilient tab connected to the body element 116. In the rest position, i.e., the position in which it is not stressed, the second resilient clamping tab 150, as the second resilient clamping element 150, is adapted to protrude from the substantially planar surface of the body element 116 to engage in a contact relationship with the second retaining element 148 (see FIG. 5), preventing the latter from being displaced from said clamping position. On the other hand, in the stressed position (see FIG. 6), obtained, for example, by manually applying a second manual pressure P2, the second resilient clamping tab 150 is adapted to position itself substantially flush with the planar surface of the body element 116 to disengage the second retaining element 148, allowing the latter to be displaced from said clamping position.

Preferably, the second retaining element 148 is configured to glide substantially in sliding contact, when moved between said clamping position and said release position, on a second substantially planar surface portion 116*b* of the respective body element 116 with which the second resilient clamping element 150 is made integral. On the other hand, the second resilient clamping element 150 is formed substantially on said second surface portion 116*b* and is also configured to protrude from and be flush with said second portion of surface 116*b*, respectively, in said rest position and in said stressed position.

In the preferred embodiment, the second resilient clamping tab 150, as the second resilient clamping element 150, is formed in one piece with the body element 116 with which it is made integral.

In the most preferred embodiment, the second resilient clamping tab 150, as the second resilient clamping element 150, is formed of harmonic steel, and even more preferably in one piece with the body element 116 of harmonic steel. As mentioned above, the embodiment providing for the body element 116 formed of harmonic steel advantageously provides a reliable resilient bias for a scraping element 106 in contact with the side 16 and/or bottom 18 walls of the processing tank 14.

Referring in particular to FIGS. 7 and 8, said second releasable clamping assembly 146 comprises said second retaining element 148 and preferably at least one third engagement through hole 152 engageable by a respective at least one second protruding assembly element 154.

Said at least one third engagement through hole 152 (two in the accompanying figures) is formed substantially on one of said scraping and/or mixing element 106 and said body element 116 at the overlap region therebetween.

In the present preferred embodiment, the third engagement through holes 152 are formed on the body element 116 substantially at the overlap region thereof with the scraping and/or mixing element 106.

On the other hand, said at least one second protruding assembly element 154 (two in the accompanying figures) preferably provides for a substantially cylindrical shape and extends from the surface of the other of said scraping and/or mixing element 106 and said body element 116 at the overlap region therebetween.

In the present preferred embodiment, the second protruding assembly elements 154 extend from the scraping and/or mixing element 106 substantially at the overlap region thereof with the body element 116.

Each of the second protruding assembly elements 154 is configured to engage a respective third engagement through hole 152 when the scraping and/or mixing element 106 and the body element 116 are coupled together such that a respective second clamping seat 156 (best seen in FIG. 8) of the second protruding assembly elements 154 protrudes from the stack defined by the overlap of said scraping and/or mixing element 106 and said body element 116.

In addition, said second retaining element 148 comprises at least one second clamping section 158 (best seen in FIG. 7) adapted to cooperate with the second clamping seat 156 of a respective second protruding assembly element 154. In particular, the second retaining element 148 is configured to move between said clamping position, in which each second clamping section 158 cooperates with the second clamping seat 156 of a respective second protruding assembly element 154 to mutually clamp the body element 116 on the scraping and/or mixing element 106, and said release position, in which the latter are mutually released.

Preferably, said scraping and/or mixing element 106 comprises a second support body 160 provided with at least one fourth engagement through hole 162 (two in the accompanying figures), and a second retaining base 164 provided with said at least one second protruding assembly element 154.

The second support body 160, for example having a planar plate shape preferably made of a plastic material such as Teflon, preferably extends in one piece from an edge of a scraping and/or mixing body 166, also preferably made of a plastic material such as Teflon. Said at least one fourth engagement through hole 162 passes through the thickness of the plate and substantially defines the second support body 160. In operating conditions, the scraping and/or mixing body 166 is adapted to be in sliding contact with the inner surface of the bottom 18 and/or side 16 walls of the processing tank 14 and/or mixing food product.

The second retaining base 164, for example having a planar plate shape preferably made of steel or a plastic material such as Teflon, is provided separately from the second support body 160. In particular, said at least one second protruding assembly element 154 (two in the accompanying figures) is preferably formed of the same material as the second retaining base 164 and extends from a surface thereof. In addition, as mentioned above, said at least one second protruding assembly element 154 preferably provides for a substantially cylindrical shape and comprises said second clamping seat 156 at its distal end from the second retaining base 164.

In particular, the second support body 160 and the second retaining base 164 may be coupled together by engaging the fourth engagement through holes 162 with the respective second protruding assembly elements 154 so that the latter protrude from said second support body 160.

In the present most preferred embodiment, each of the second protruding assembly elements 154 preferably has a substantially cylindrical or parallelepipedal shape in which the second clamping seat 156 provides for a second small-diameter portion 168 having an outer diameter that is smaller than other portions. Said second small-diameter portion 168 is formed in a portion having a predetermined height that is separated by the distal end of the respective second protruding assembly element 154 from the second retaining base 164.

In addition, each second clamping section 158 of the second retaining element 148 preferably comprises at least one second engagement opening 170, such as a notch formed on the edge, which in turn is provided with a second clamping region 172. In particular, each second clamping region 172 has an inner diameter substantially corresponding to the outer diameter of the second small-diameter portion 168 of the corresponding second protruding assembly element 154.

Therefore, at said clamping position of the second retaining element 148 arranged on the stack defined by the overlap of the scraping and/or mixing element 106 and the body element 116, the second small-diameter portion 168 of each second protruding assembly element 154 is engaged by a respective second clamping region 172 of the second retaining element 148. In this state, the second retaining element 148 mutually presses the scraping and/or mixing element 106 onto the body element 116, thereby securing them together.

On the other hand, from said clamping position, the second retaining element 148 may be moved to said release position by sliding out, i.e., sliding on the stack defined by the overlap of the scraping and/or mixing element 106 and the body element 116, to disengage each second small-diameter portion 168 from the respective second clamping region 172. In this state, the second retaining element 148 releases the mutual attachment of the scraping and/or mixing element 106 with the body element 116.

Advantageously, the embodiment which provides for the support element 114, the body element 116, and the scraping and/or mixing element 106 to be separate and releasably attachable to each other by respective first 118 and second 146 releasable clamping assemblies ensures a further effective construction suitable for reducing or eliminating screw and/or bolt elements, thereby substantially eliminating the need for tools for assembly/disassembly of the quick-release attachment assembly 108.

In particular, with this construction the scraping and/or mixing assembly 100 provides for ease of operation, for example, it being possible to use the same hand to support the body element 116 and operate either one or both of the first 122 and second 150 resilient clamping elements, while ensuring the secure attachment of the scraping and/or mixing element 106 to the mixing arm element 104.

The embodiment in which the two resilient clamping elements, first 122 and second 150, are integral with the body element 116 is extremely easy and intuitive to operate and easy to clean because the body element 116 may be easily pulled out and manipulated. In particular, with this construction, it is extremely easy to perform the assembly/disassembly of the quick-release attachment assembly 108 manually without the use of tools.

Moreover, this construction provides the scraping and/or mixing assembly 100 with a high degree of versatility in both design and use.

In fact, in this state, features, such as shape and materials of each element (support 114, body 116 and scraping and/or mixing 106) may be selected from a wide range at the design stage based on the function (scraping and/or mixing) and type of food product. For example, the scraping and/or mixing element 106 may be formed of a material suitable for the scraping function, such as Teflon, while the body element 116 may be formed of a material with high strength and reliable springback characteristics, such as harmonic steel, so that an effective combination of the features of different materials may be achieved.

Further, in this state one or both of the body 116 and scraping and/or mixing elements 106 may be disassembled as needed or required for maintenance (e.g., replacement of a single element) or preferably daily cleaning (e.g., removal and cleaning of one or both elements).

Hereinafter, with particular reference to FIGS. 10 to 12 together with FIGS. 5 and 6, a method is now described for the disassembly/assembly of the scraping and/or mixing assembly 100 having the features of any of the embodiments described above.

Figure 10:
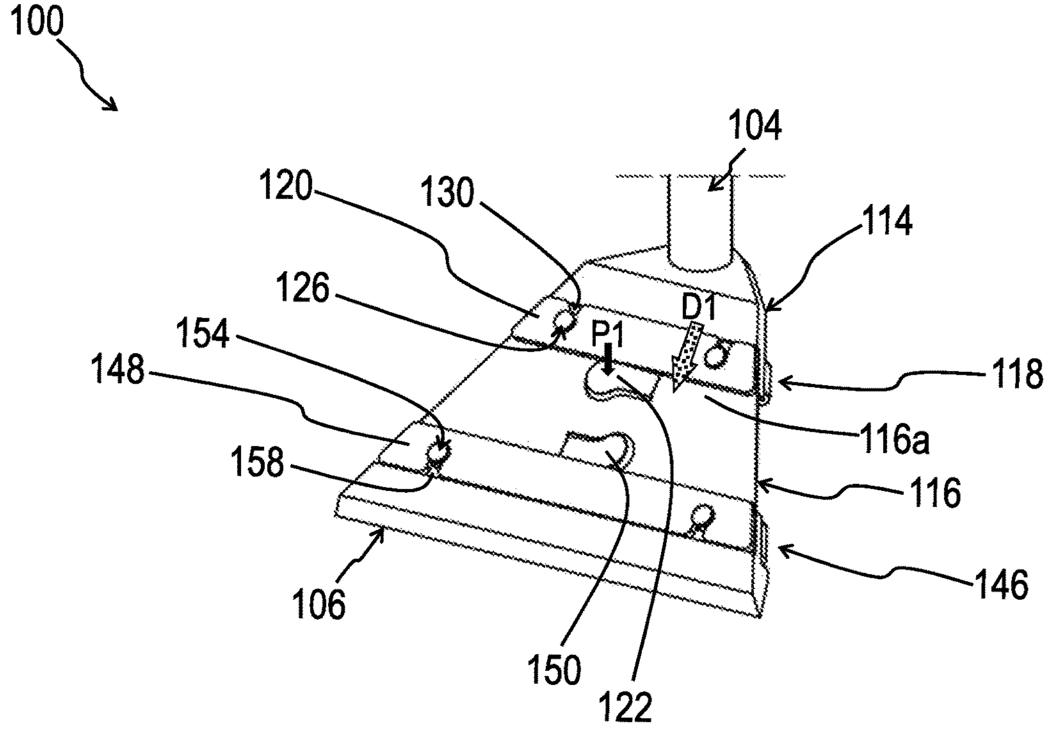
FIG. 10 is a perspective view of the scraping and/or mixing assembly of FIG. 4 in a first stage of disassembly.

Starting from a condition in which the scraping and/or mixing assembly 100 is in the assembled state, as shown in FIGS. 5, 6 and 10, an initial pressure P1 is applied, preferably manually, to the first resilient clamping element 122 to move it from said rest position, in which it engages the first retaining element 120 by holding it in said clamping position, towards said stressed position in which it disengages the first retaining element 120 by releasing it from said clamping position.

Thus, referring to FIGS. 10 and 6, the first retaining element 120 is moved along a first extraction direction D1, preferably by hand, from said clamping position, in which it cooperates with the support element 114 and the body element 116 by mutually clamping them, to said release position, in which the latter are released.

In particular, by moving from said clamping position to said release position along the first extraction direction D1, the first retaining element 120 is substantially slid onto the stack defined by the overlap of the support element 114 and the body element 116, to release each first protruding assembly element 126 from its respective first clamping section 130. In this state, as shown in FIG. 11, the first retaining element 120 releases the mutual attachment of the support element 114 to the body element 116.

Figure 11:
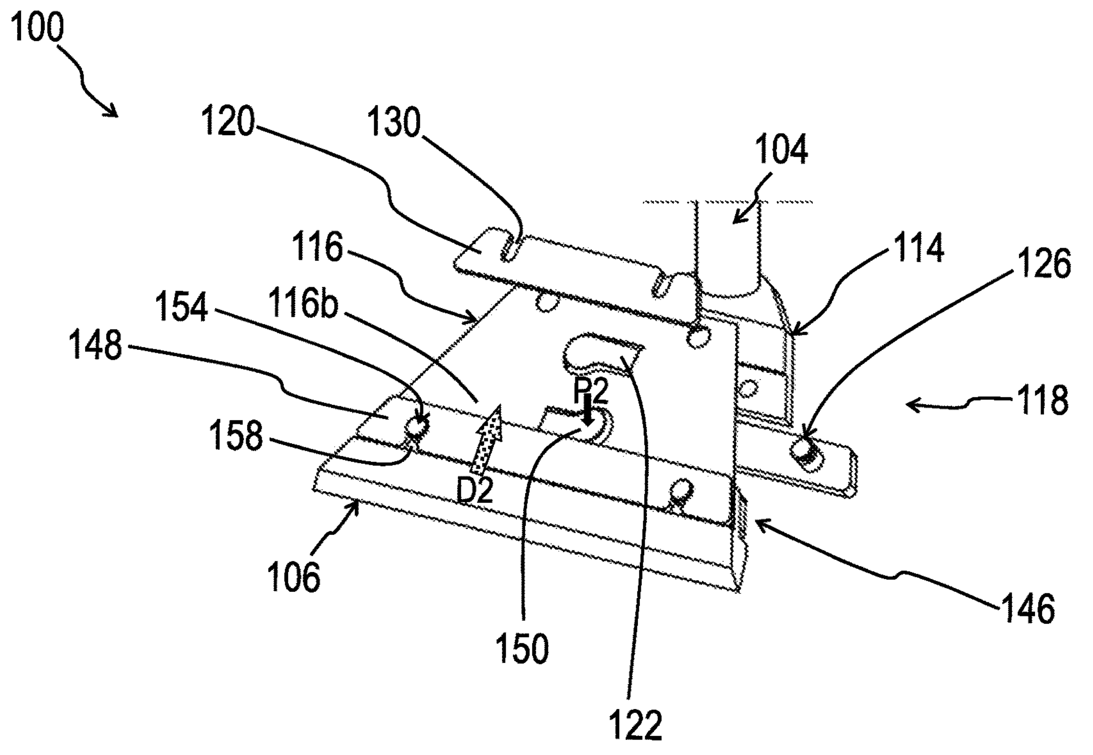
FIG. 11 is a perspective view of the scraping and/or mixing assembly of FIG. 4 in a second stage of disassembly.
Figure 12:
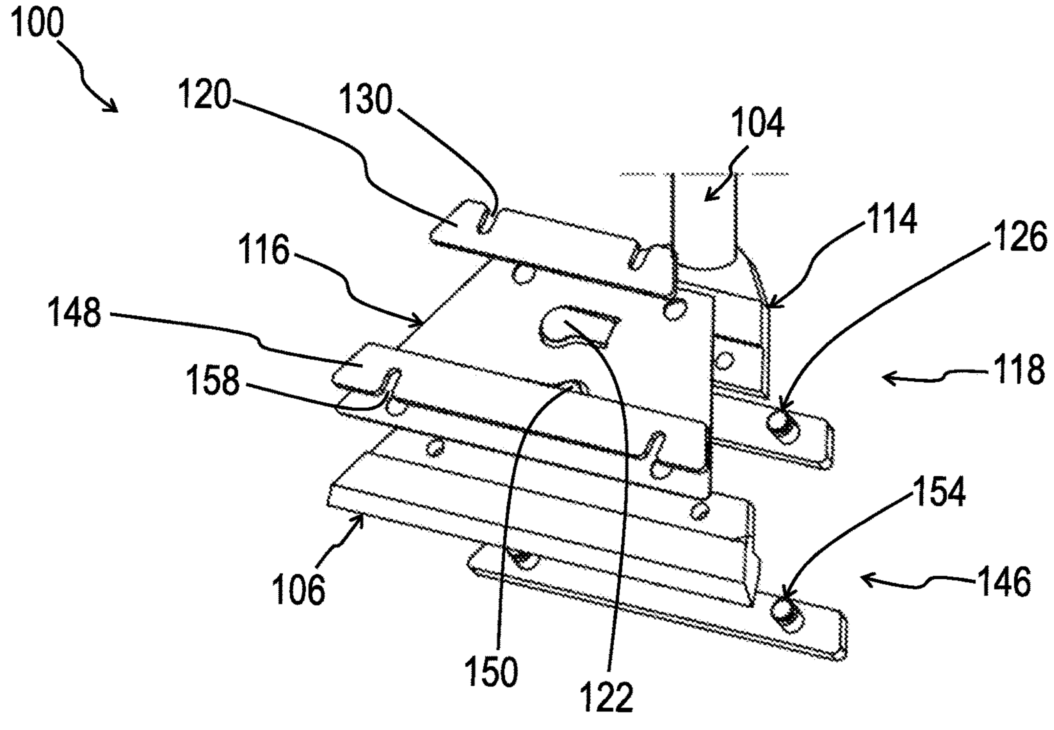
FIG. 12 is a perspective view of the scraping and/or mixing assembly of FIG. 4 in a third stage of disassembly.

Subsequently, as shown in FIGS. 11 and 6, a second pressure P2 is applied, preferably manually, to the second resilient clamping element 150 to move it from said rest position, in which it engages the second retaining element 148 by holding it in said clamping position, to said stressed position, in which it disengages the second retaining element 148 by releasing it from said clamping position.

Thus, again referring to FIGS. 11 and 6, the second retaining element 148 is moved along a second extraction direction D2, preferably manually, from said clamping position, where it cooperates with the scraping and/or mixing element 106 and the body element 116 by mutually clamping them, to said release position, where the latter are released.

In particular, by moving it from said clamping position to said release position along the second extraction direction D2, the second retaining element 148 is slid substantially onto the stack defined by the overlap of the scraping and/or mixing element 106 and the body element 116, to disengage each second protruding assembly element 154 from its respective second clamping section 158. In this state, as shown in FIG. 12, the second retaining element 148 releases the mutual attachment of the scraping and/or mixing element 106 to the body element 116.

From the disassembled state (shown in FIG. 12) it is possible to subsequently obtain the assembled state (shown in FIG. 10) of the scraping and/or mixing assembly 100 by substantially performing the steps described above in reverse.

The following is a description of a further embodiment of the present invention involving modifications to some components of the scraping and/or mixing assembly 100. Thus, the components that are substantially unchanged will not be specifically described again, and the same numerical references will be used.

In the present further embodiment, the scraping and/or mixing assembly 100 is substantially identical to that of the previous embodiment, except for the type of connection of the support element 114 to the mixing arm element 104.

Figure 13:
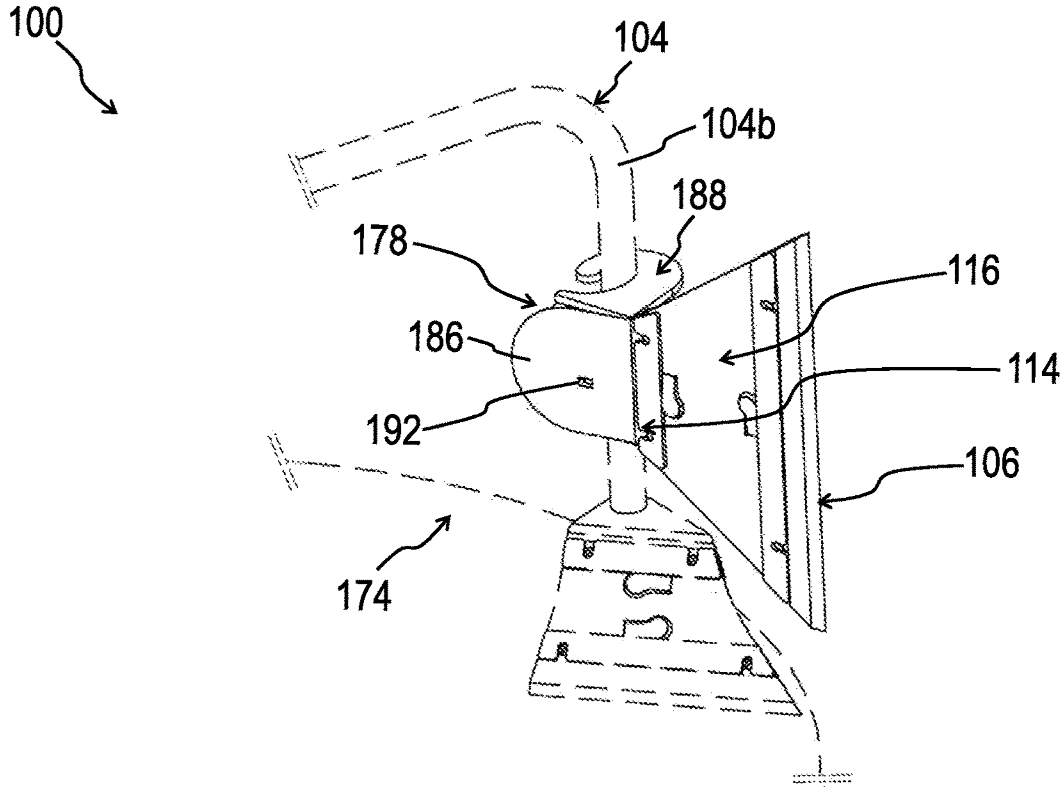
FIG. 13 is a perspective view of a scraping and/or mixing assembly, according to a further embodiment, in an assembled state.
Figure 14:
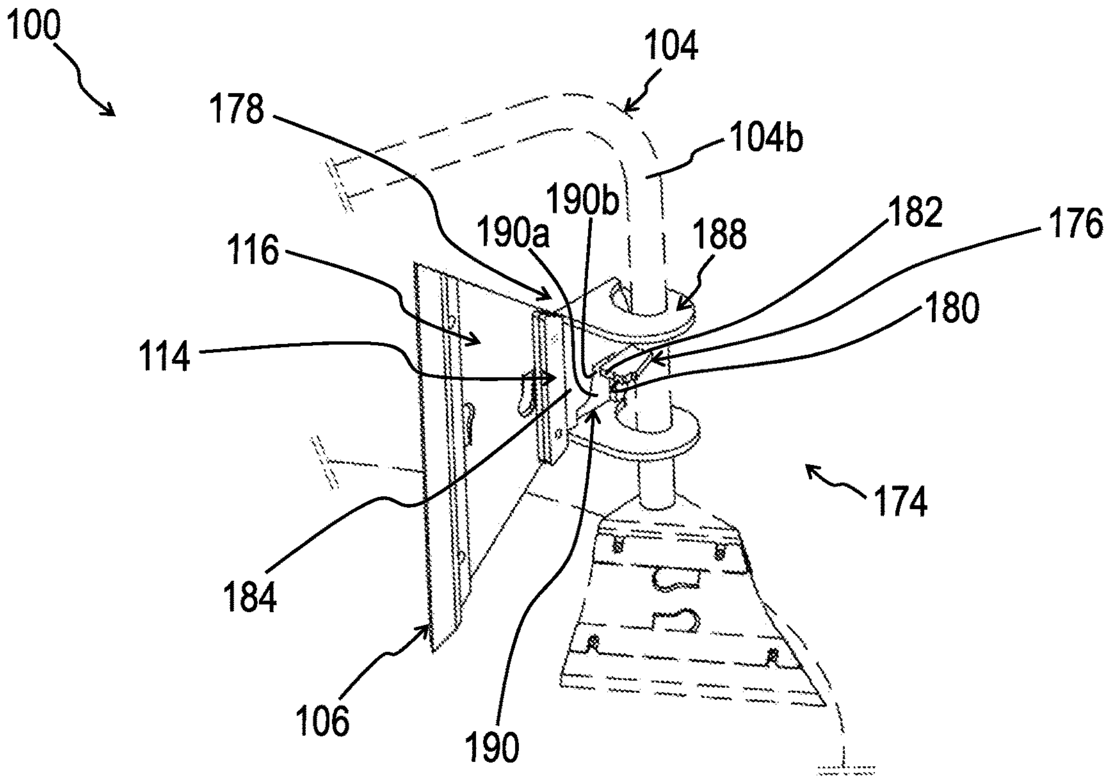
FIG. 14 is a perspective view of the scraping and/or mixing assembly of FIG. 13, in an assembly stage.

In particular, with reference to FIGS. 13 and 14, in the present further embodiment, the support element 114 is releasably connected by a snap connection assembly 174 to a portion of the mixing arm element 104 (shown by hatching in FIGS. 13 and 14), such as the second portion **104*b***.

In particular, the snap connection assembly 174 comprises a first connecting element 176 extending from the second portion **104*b* of the mixing arm element 104, and a second connecting element 178 connected to the support element 114 and snap-couplable to the first connecting element 176**.

The first connecting element 176, such as a plate, provides a hook tooth 180 extending protruding from a first edge surface 182 distal from the mixing arm element 104.

The second connecting element 178 comprises a centering plate 184 connected to the support element 114, and a resilient retaining plate 186 substantially superimposed on the centering plate 184 and additionally attached to the latter in such a way that it may be resiliently deformed, preferably manually, between a stop position, in which it abuts the centering plate 184, and a deformed separation position, in which it is at least partially separated from the centering plate 184.

The centering plate 184 in turn has a hook structure 188 and a centering through opening 190 extending through its thickness.

Preferably, the hook structure 188, such as a pair of hook elements extending parallel to each other and orthogonally from the centering plate 184, is configured to releasably couple the second connecting element 178 to the second portion **104*b***, while being able to rotate about it.

The centering through opening 190 provides for a first region **190*a* and a second region 190*b* which are continuous with each other. The first region 190*a* has a greater extension than the second region 190*b* which, in turn, is configured to receive substantially by shape-coupling the first edge surface 182 of the first connecting element 176**.

The centering through opening 190 and its first **190*a* and second 190*b* regions are formed at a position of the centering plate 184 to be substantially engaged, i.e. covered, by the resilient retaining plate 186 resilient when the latter is in the abutment position on the centering plate 184**.

In particular, the hooking structure 188 is configured to couple the second connecting element 178 to the second portion **104*b* of the mixing arm element 104 such that the centering through opening 190 is reversibly engageable by the first connecting element 176 by arranging its first edge surface 182 to substantially face or abut the retaining spring plate 186 when the latter is in the abutment position on the centering plate 184**.

The resilient retaining plate 186 further comprises a hook seat 192, such as a through opening, which is formed facing the second region **190*b* of the centering through opening 190 of the centering plate 184. The hook seat 192 is configured to receive, preferably by shape-coupling, the hook tooth 180 of the first connecting element 176 when the latter engages the second region 190*b* of the centering through opening 190 of the centering plate 184**.

Therefore, with this construction, it is possible to connect the first connecting element 176 to the second connecting element 178 in such a way that the support element 114 is releasably connected to the portion of the mixing arm element 104.

First, the second connecting element 178 is coupled to the second portion 104*b* of the mixing arm element 104 at the first connecting element 176 by the hook structure 188.

Subsequently, the second connecting element 178 is moved, i.e., rotated, about the second portion 104*b* by means of the hook structure 188 to engage the first region 190*a* of the centering through opening 190 with the first connecting element 176. In this state, the first edge surface 182 of the first connecting element 176 engages the first region 190*a* and the hook tooth 180 stresses the resilient retaining plate 186, pushing it into said deformed separation position.

Thus, the second connecting element 178 is moved, i.e., displaced, to align the hook tooth 180 of the first connecting element 176 with the hook seat 192 of the second connecting element 178. In this state, the hook seat 192 is engaged by the hook tooth 180 while the resilient retaining plate 186 resiliently returns to the abutment position, and the first edge surface 182 of the first connecting element 176 comes into abutment with the resilient retaining plate 186, thereby snapping the support element 114 to the portion of the mixing arm element 104.

From this state, it is possible to disconnect the support element 114 from the portion of the mixing arm element 104 by acting, preferably manually, on the resilient retaining plate 186 to move it to said deformed separation position, disengaging the hook seat 192 from the hook tooth 180, and essentially repeating the steps described above in reverse.

It is evident how additional embodiments of the scraping and/or mixing assembly 100 are possible relative to that which has been described so far, without departing from the claimed scope of protection.

In fact, with respect to the previous description, the scraping and/or mixing assembly 100 may provide for first 126 and second 154 protruding assembly elements, which are made integral or in one piece with the respective support element 114 and scraping and/or mixing element 106. In other words, further embodiments may be provided wherein the first 136 and second 164 retaining bases and the first 126 and second 154 protruding assembly elements are made integral or in one piece with the respective first 132 and second 160 support bodies of the support element 114 and the scraping and/or mixing element 106.

In addition, with reference to the foregoing description, it is apparent that it is possible to reverse the arrangement of the first 126 and second 154 protruding assembly elements, and the first 124 and third 152 engagement through holes on the support element 114, the body element 116, and the scraping and/or mixing element 106. In other words, additional embodiments may be provided wherein the first releasable clamping assembly 118 has first engagement through holes 124 formed on the support element 114 and first assembly protrusions 126 formed on the body element 116, and/or the second releasable clamping assembly 146 has third engagement through holes 152 formed on the scraping and/or mixing element 106 and second assembly protrusions 154 formed on the body element 116.

Further, with reference to the foregoing description, it is apparent that further embodiments may be contemplated in which the scraping and/or mixing assembly 100 comprises the first releasable clamping assembly 118 and the body element 116 is connected to the scraping and/or mixing element 106 by other types of connecting means, such as interlocking means, or are made integral with each other by other means.

Further, with reference to the foregoing description, it is apparent that other embodiments may be contemplated in which the scraping and/or mixing assembly 100 comprises first 122 and second 150 resilient clamping elements, which, instead of being formed in one piece with the body element 116, may be formed separately and subsequently made integral therewith by, for example, welding.

From that which has been described so far, it is evident how important achievements have been made, overcoming the drawbacks of the state of the art, making it possible to create a scraping and/or mixing assembly 100 for a mixing apparatus 10 for food, pharmaceutical or cosmetic products, comprising an effective construction suitable for reducing or eliminating screw and/or bolt elements.

In addition, the scraping and/or mixing assembly 100 provides for easy operation, preferably without the use of assembly/disassembly tools. In fact, the quick-release attachment assembly 108 allows for easy handling and intuitive operation, particularly due to the first 122 and second 150 resilient clamping elements and the respective first 120 and second 148 retaining elements.

In addition, the scraping and/or mixing assembly 100 provides for a secure attachment of the scraping and/or mixing element 106 to the mixing arm element 104. In fact, the quick-release attachment assembly 108, particularly by means of the first 122 and second 150 resilient clamping elements, provides for secure clamping of the first 120 and second 148 retaining elements when the scraping and/or mixing assembly 100 is in the assembled state.

In addition, the scraping and/or mixing assembly 100 provides a construction that is easy to manufacture, maintain, and clean. In fact, the quick-release attachment assembly 108 comprises components having a construction that is easy to manufacture, maintain and clean.

In addition, the construction of the quick-release attachment assembly 108 may vary widely in design depending on the function (scraping and/or mixing) and type of food product.

Naturally, the materials and equipment used in the manufacture of the present invention, as well as the shape and size of the individual components, may be the most suitable according to specific requirements.

The invention claimed is:

1. A scraping and/or mixing assembly for mixing apparatus for food, pharmaceutical, or cosmetic products, the scraping and/or mixing assembly comprising at least one mixing arm element and at least one respective scraping and/or mixing element which are removably attachable to each other by means of a quick-release attachment assembly including:

a support element connected to a portion of the mixing arm element, and a body element connected to the scraping and/or mixing element and operatively adapted to couple by means of an overlapping relationship with the support element, wherein the support element and the body element are attachable to each other by a first releasable clamping assembly comprising:

a first retaining element adapted to move between a clamping position, in which it cooperates with the support element and the body element to mutually clamp them, and a release position, in which the latter are released, wherein the first releasable clamping assembly further comprises a first resilient clamping element made integral with one of the body element and the support element, the first resilient clamping element being movable between a rest position, in which it is adapted to engage the first retaining element to hold the latter in the clamping position, and a stressed position, in which it is adapted to disengage the first retaining element to release the latter from the clamping position, the body element and the scraping and/or mixing element are operatively adapted to couple by overlapping relationship and are attachable to each other by a second releasable clamping assembly comprising:

a second retaining element adapted to move between a clamping position, in which it cooperates with the body element and the scraping and/or mixing element to clamp them together, and a release position, in which the latter are released, the second releasable clamping assembly further comprising a second resilient clamping element made integral with one of the body element and the scraping and/or mixing element, and the second resilient clamping element being movable between a rest position, in which it is adapted to engage the second retaining element to hold the latter in the clamping position, and a stressed position, in which it is adapted to disengage the second retaining element to release the latter from the clamping position.

2. The scraping and/or mixing assembly of claim 1, wherein the first releasable clamping assembly comprises:

at least one first engagement through hole formed on one of the support element and the body element at the overlap region therebetween, at least one first protruding assembly element extending from the other of the support element and the body element at the overlap region therebetween, and the at least one first protruding assembly element being configured to engage a respective one of the at least one first engagement through hole when the support element and the body element are coupled together such that a first clamping seat of the at least one first protruding assembly element protrudes from the stack defined by the overlap of the support element and the body element, and the first retaining element comprising at least one first clamping section, the first retaining element being configured to move between the clamping position, in which the first clamping section cooperates with the first clamping seat of one respective of the at least one first protruding assembly element to mutually clamp the body element to the support element, and the release position, in which the latter are released.

3. The scraping and/or mixing assembly of claim 2, wherein the first clamping seat of the at least one protruding assembly element provides a small-diameter portion having a smaller outer diameter than other portions thereof and formed in a portion having a predetermined height, and the first clamping section of the first retaining element comprising at least one engagement opening provided with a clamping region having an inside diameter corresponding to the outer diameter of the small-diameter portion of the protruding assembly element.

4. The scraping and/or mixing assembly of claim 1, wherein the support element comprises a first support body provided with at least one second engagement through hole, and a first retaining base provided with the at least one first protruding assembly element, the first support body and the first retaining base being coupled together to engage the at least one second engagement through hole with a respective one of the at least one first protruding assembly element so that the latter protrudes from the first support body.

5. The scraping and/or mixing assembly of claim 1, wherein the second releasable clamping assembly comprises:

at least one third engagement through hole formed on one of the body element and the scraping and/or mixing element at the overlap region therebetween, at least one second protruding assembly element extending from the other of the body element and the scraping and/or mixing element at the overlap region therebetween, and the at least one second protruding assembly element being configured to engage a respective one of the at least one third engagement through hole when the body element and the scraping and/or mixing element are coupled together such that a second clamping seat of the at least one second protruding assembly element protrudes from the stack defined by the overlap of the body element and the scraping and/or mixing element, and the second retaining element comprising at least one second clamping section, the second retaining element being configured to move between the clamping position, in which the second clamping section cooperates with the second clamping seat of a corresponding one of the at least one second protruding assembly element to mutually clamp the body element and the scraping and/or mixing element, and the release position, in which the latter are released.

6. The scraping and/or mixing assembly of claim 1, wherein the scraping and/or mixing element comprises a second support body provided with at least one fourth engagement through hole and a second retaining base provided with the at least one second protruding assembly element, the second support body and the second retaining base being coupled together to engage the at least one fourth engagement through hole with a respective one of the at least one second protruding assembly element so that the latter protrudes from the second support body.

7. The scraping and/or mixing assembly of claim 1, wherein the first resilient clamping element is formed in one piece with the respective one of the body element, the support element, and the scraping and/or mixing element with which it is made integral.

8. The scraping and/or mixing assembly of claim 1, wherein the first resilient clamping element is formed of harmonic steel.

9. The scraping and/or mixing assembly of claim 1, wherein the support element is releasably connected to said portion of the mixing arm element by means of a snap connection assembly.

10. A mixing apparatus for food, pharmaceutical or cosmetic products comprising a rotary drive assembly configured to connect to and to rotate a scraping and/or mixing assembly according to claim 1.

11. A scraping and/or mixing assembly for mixing apparatus for food, pharmaceutical, or cosmetic products, the scraping and/or mixing assembly comprising at least one mixing arm element and at least one respective scraping and/or mixing element which are removably attachable to each other by means of a quick-release attachment assembly including:

a support element connected to a portion of the mixing arm element, and a body element connected to the scraping and/or mixing element and operatively adapted to couple by means of an overlapping relationship with the support element wherein the support element and the body element are attachable to each other by a first releasable clamping assembly comprising:

a first retaining element adapted to move between a clamping position, in which it cooperates with the support element and the body element to mutually clamp them, and a release position, in which the latter are released, wherein the first releasable clamping assembly further comprises a first resilient clamping element made integral with one of the body element and the support element, the first resilient clamping element being movable between a rest position, in which it is adapted to engage the first retaining element to hold the latter in the clamping position, and a stressed position, in which it is adapted to disengage the first retaining element to release the latter from the clamping position, the first retaining element is configured to glide when moved between the clamping position and the release position on a surface portion of the respective one of the body element, the support element and the scraping and/or mixing element with which the first resilient clamping element is made integral, and the first resilient clamping element is configured to protrude from the surface portion in the rest position and to be flush with the surface portion in the stressed position.

* * * * *